June 18, 1957 M. H. GROVE ET AL 2,796,230
VALVE CONSTRUCTION
Filed March 23, 1951 8 Sheets-Sheet 1

FIG_4_

FIG_3_

FIG_1_

FIG_2_

INVENTORS
Marvin H. Grove
Austin U. Bryant
ATTORNEYS

June 18, 1957   M. H. GROVE ET AL   2,796,230
VALVE CONSTRUCTION
Filed March 23, 1951   8 Sheets-Sheet 2

INVENTORS
Marvin H. Grove
Austin U. Bryant
BY
ATTORNEYS

June 18, 1957  M. H. GROVE ET AL  2,796,230
VALVE CONSTRUCTION
Filed March 23, 1951  8 Sheets-Sheet 5

FIG_12_

FIG_13_

FIG_14_

INVENTORS
Marvin H. Grove
Austin U. Bryant
BY
ATTORNEYS

FIG_16_

FIG_18_

FIG_17_

INVENTORS
Marvin H. Grove
Austin U. Bryant
BY
ATTORNEYS

United States Patent Office 2,796,230
Patented June 18, 1957

2,796,230

VALVE CONSTRUCTION

Marvin H. Grove, Piedmont, and Austin U. Bryant, Berkeley, Calif., assignors, by mesne assignments, to Walworth Company, New York, N. Y., a corporation of Massachusetts Application March 23, 1951, Serial No. 217,265

13 Claims. (Cl. 251—172)

This invention relates generally to valves such as are employed for controlling the flow of various fluids, including both gases and liquids. The present application is a continuation-in-part of our copending application Serial No. 46,682 filed August 28, 1948, now abandoned.

It is a general object of the invention to provide a new and improved type of high pressure valve, that is a valve suitable for pressures well in excess of say 300 p. s. i., and which for instance may be adapted for pressures ranging from 1000 to 10,000 p. s. i. or more.

Another object of the invention is to provide a high pressure valve characterized by its ability to maintain a tight seal against leakage, and which in addition will be relatively easy to operate.

A further object of the invention is to provide a novel valve construction which is substantially balanced with respect to line pressures, whereby a minimum amount of force is required to move the valve member between its full open and closed positions.

Another object of the invention is to provide a practical high pressure valve which can be used under relatively severe conditions, as with liquids carrying gritty solids, and which will maintain a fluid tight seal under such conditions for a relatively long period of time compared to conventional valves.

Another object of the invention is to provide a valve having seal rings which are urged against the valve member irrespective of whether the line or body pressure is greater.

Another object of the invention is to provide means whereby seal rings can be tightly pressed against the valve member to insure a fluid tight seal.

Additional objects of the invention will appear from the following description in which the preferred embodiments have been illustrated in detail in conjunction with the accompanying drawing.

Referring to the drawing.

The gate type of valve illustrated in Figures 1 to 4 inclusive consists of a body 10 formed of suitable material such as steel or a steel alloy and which has aligned passages 11 and 12 for flow of fluid. In this instance the body 10 is formed from a square steel billet, and to facilitate connections to adjacent piping the sides of the body surrounding the passages 11 and 12 are provided with the machined pads 13 and tapped holes 14 for coupling to associated pipe flanges. It will be evident that instead of making provision for coupling to pipe flanges, passages 11 and 12 can be threaded for making threaded engagement with piping, or may be otherwise formed to make desired coupling connections.

Figures 1, 2, 3, 4:
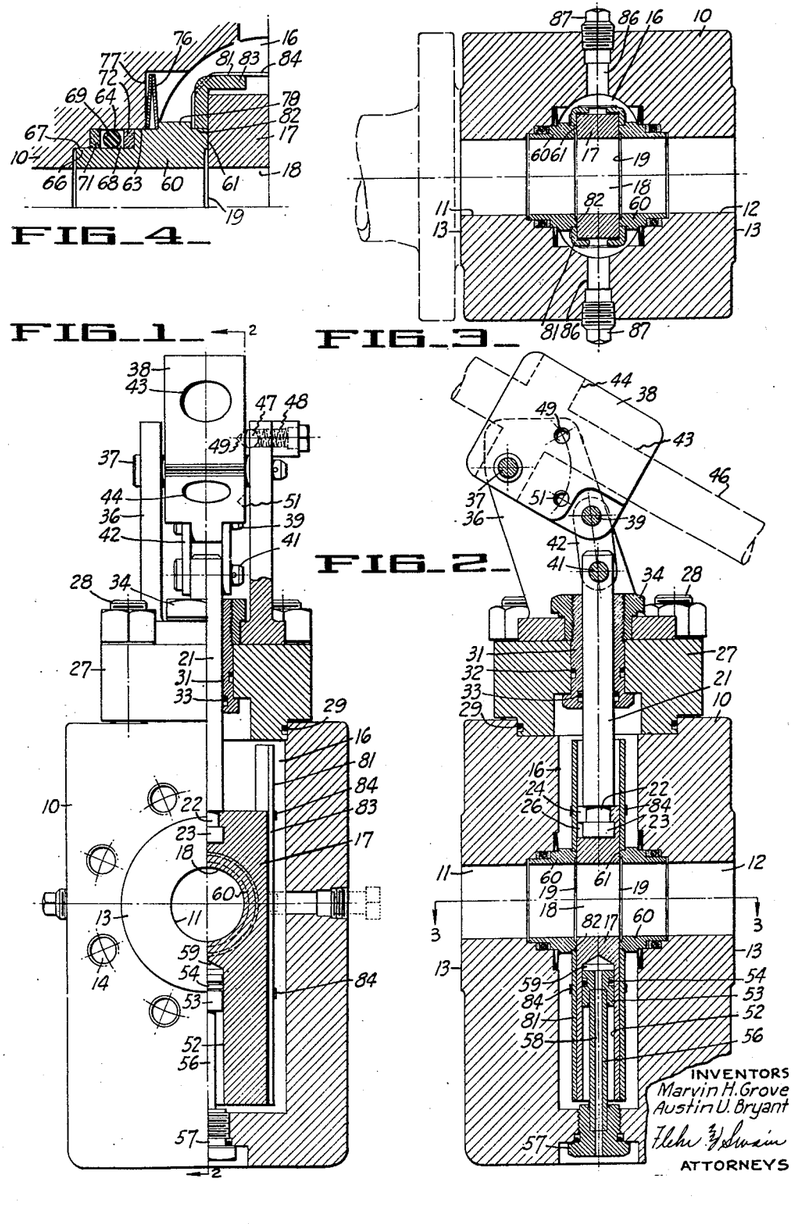
Figure 1 is a side elevational view, partly in section, illustrating a gate valve incorporating the present invention.
Figure 2 is a cross-sectional view taken along the line 2—2 of Figure 1.
Figure 3 is a cross-sectional view taken along the line 3—3 of Figure 2.
Figure 4 is an enlarged cross-sectional detail showing the sealing ring and associated parts incorporated in the valve of Figures 1 and 2.

The interior of the body 10 is machined to provide a space 16 for receiving the movable valve member or gate 17. This member is in the form of a substantially flat metal plate having a port or opening 18 adapted to register with the passages 11 and 12, and having its side faces 19 suitably machined to form valve working surfaces. The type of machining employed can vary with the tightness desired, and with the particular service to which the valve is adapted. In most instances it is desirable to provide relatively true lapped surfaces, such as are obtained by the use of so-called lapping machines.

Various types of operating means can connect to the valve member 18 for its operation between open and closed positions. In this instance an operating stem 21 is provided, which has its inner end connected to the valve member 18, and its outer end connected with hand operating means. Thus the inner end of stem 21 is provided with a portion 22 of reduced diameter, and an end enlargement or head 23. These portions are accommodated in the slot-like recesses 24 and 26 which are formed in the adjacent end portion of the gate 17, and which extend from one side of the gate, whereby the stem can be readily detached from the gate after these parts are withdrawn from the body.

The stem 21 extends through the body closure or bonnet 27, which is suitably attached to the body as by means of studs 28, and is sealed with respect to the body by suitable means such as the resilient O ring 29. A bushing 31 is fitted in the bonnet 27, and is sealed with respect to the latter by suitable means such as the O ring 32, and sealed with respect to the stem 21 by suitable means such as the resilient O ring 33. The outer end bushing 31 is engaged by the nut 34, and serves to mount a bracket 36 for a purpose to be presently described.

While a conventional hand wheel type of operator can be provided for the stem 21, we prefer to provide for application of a bar or lever which can be quickly swung between open and closed positions. Thus the bracket 36 supports a pivot pin 37 which serves to pivotally mount the member 38. This member is also connected by pins 39 and 41, and by links 42, with the adjacent end of stem 21. Member 38 is provided with openings 43 and 44 which may be at right angles to each other, and which serve to accommodate the bar 46 or other operating member. When the right hand end portion of bar 46 (as viewed in Figure 2) is swung upwardly, stem 21 is lifted to move the valve member to closed position.

Suitable detent means can be provided to facilitate location of the valve member in full open and closed positions. Thus the bracket 36 is shown supporting a detent ball 47 together with compression spring 48. The ball is urged against the adjacent side face of member 38, and for full closed and open positions it engages in the depressions 49 and 51.

In this embodiment the gate is balanced with respect to line pressure for open, closed and intermediate positions of the same. Thus the gate is provided with a bore 52 in alignment with the stem 21, and within this bore there is a piston or plunger 53 suitably sealed with respect to the side surfaces of the bore as by means of the resilient O ring 54. This piston is attached to the hollow rod or tube 56, which has its outer end carried by a fitting 57 which is threaded into the body, and sealed with respect to the same. Tube 56 provides a vent passage 58 which communicates between the closed space 59 on one side of the piston 53 and the atmosphere. Piston 53 is formed to the same diameter as stem 21 and therefore since one side of this piston is exposed to atmospheric pressure, the net effect is to provide a fluid pressure area which balances the effective fluid pressure area of the stem 21.

A special and novel arrangement of parts is provided for establishing a seal between the valve working surfaces 19 and the body, in a zone surrounding the passages 11 and 12. This means makes use of a pair of seal or seat rings 60 which are made of a suitable material such as a hard wear resisting metal. These rings may be duplicates and their construction in this instance is illustrated particularly in Figure 4. The inner end of each ring is provided with an offset annular surface 61 adapted to contact and seal upon the adjacent valve working surface 19. Surfaces 61 can be finished in accordance with the tightness of seal desired, but preferably to secure best tightness these surfaces are machine lapped in the same manner as surfaces 19.

Each of the seat rings are also in this instance machined to provide the cylindrical peripheral surface 63, which slidably fits the cylindrical bore 64 of the body, and a cylindrical surface 66 which slidably fits within the cylindrical body bore 67. Since the bores 64 and 67 are stepped on different diameters, an annular space 68 is formed between the ring and the body, and which serves to accommodate yieldable sealing means which in this instance is in the form of a resilient O ring 69. This O ring can be formed of suitable resilient material such as a suitable synthetic rubber. As is well known to those familiar with the use of resilient O rings, the ring 69 should be compressed somewhat in a radial direction. The ends of the spaces 68 on both sides of each O ring 69 are preferably faced with washers 71 and 72, which can be made of some suitable composition such as leather. These washers are made to fit snugly about the cylindrical surface 66, and within the cylindrical surface 64, and serve to permit use of greater tolerances between the seal ring and the body, without sacrificing the ability of the O ring to resist relatively high pressures.

It may be explained at this point that the arrangement is such as to cause differential pressures applied to the seat rings to urge the same against the valve working surface of the valve member, irrespective of whether or not the pressure in the body, or the pressure in the body passage, is the greater. Spring means is provided for urging the sealing rings against the valve member. Thus a pair of spring metal washers 76 are provided, such as are commonly known as Belville washers. Each pair of springs act between a shoulder 77 formed on the body, and a shoulder formed by the rib 78, which is provided on the outer periphery of the sealing ring 60.

It is desirable to provide guard means for generally closing the port 18 when the valve member is moved from open to closed position. Thus a pair of guard plates 81 are provided that may be formed of suitable material such as sheet metal, and which have openings 82 to accommodate the inner opposed ends of the seat ring. The longitudinal edge portions 83 of these plates are bent to form flanges to facilitate retaining the guard plates in proper position with respect to the valve member. The guard plates are urged against opposite sides of the valve member by suitable means such as the resilient rubber bands 84.

Figure 8:
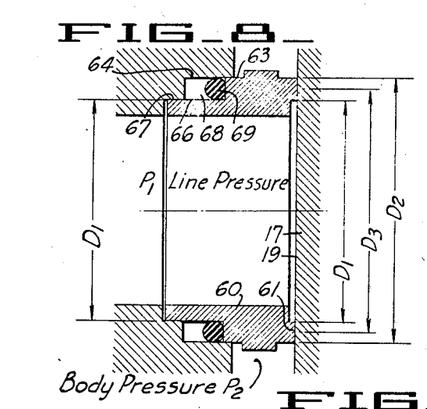
Figures 8 and 9 are semi-diagrammatic cross-sectional views showing one of the sealing rings and associated parts in the valve of Figures 1 to 4 inclusive, to facilitate an explanation of its mode of operation.

To explain operation of the valve described above, it will be presumed that it is connected in a piping system to which considerable fluid pressure is being applied, as for example a pressure of the order of 1000 p. s. i. or more. The arrangement described is such that the sealing rings are at all times urged by fluid pressure to force their lapped surfaces 61 into tight sealing engagement with the lapped surfaces 19 of the valve member. This holds true for open, closed and intermediate positions of the valve member, and irrespective of whether pressure in the flow passage of the body may be greater or less than pressure in the body space surrounding the seat rings. This effect can better be understood by reference to diagrammatic Figures 8 and 9. In Figure 8 it is assumed that the line pressure ($P_1$) is substantially greater than the body pressure ($P_2$), the body pressure being the pressure existing in the body space 16 surrounding the inner opposed end portions of the seat ring 60. The O ring 69 is urged toward the right as shown in Figure 8, and this seal, together with the seal formed by the lapped end face 61, forms in effect two opposing pistons of different diameters. For the condition of Figure 8 the effective piston diameter is the outer diameter of the O ring. The area of the lapped surface 61 is the same as the area of the O ring seal, and these areas have the same mean diameter. In Figure 8 the inner and outer diameters of this seal are identified as $D_1$ and $D_2$. The mean effective diameter of this area is identified as $D_3$. When $P_1$ is greater than $P_2$ there will be an unbalanced force on the seat ring urging the same toward the right as viewed in Figure 8, or in other words against the valve member. This force is balanced by the metal to metal engagement between the lapped surfaces 61 and 19.

Figure 9:
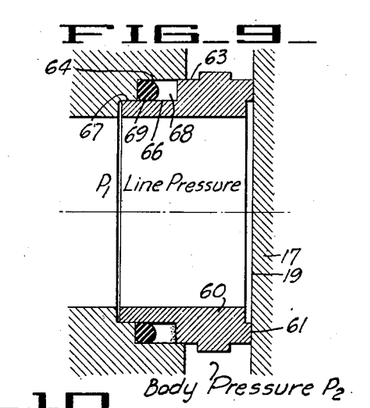

Assuming pressure $P_2$ is greater than the line pressure $P_1$, the condition is as shown in Figure 9. The effective piston diameter of the seat ring is now the inner diameter $D_1$ of the O ring. It is evident by comparison with Figure 8 that the net piston area, or difference in areas, to which the pressures $P_1$ and $P_2$ are applied, reverses in a direction at the same time as the differential pressure between $P_1$ and $P_2$ reverses in direction, and hence the net force remains in the same direction, namely to urge the seat ring toward the valve member.

A second explanation of the mode of operation is as follows: All the areas of the seat ring inside of the diameter $D_1$ are acted upon by the pressure $P_1$ only, and all areas outside of the diameter $D_2$ are acted upon by pressure $P_2$ only. With the proportions illustrated, that is with the O ring having the same inner and outer diameters as the inner and outer diameters of the lapped surface 61, there can be no end thrust from such areas, acted upon by pressures $P_1$ and $P_2$, because they are all balanced. The only areas remaining which may give end thrust are the transverse areas of the O ring ($A_1$), and the area of the lapped end face 61 ($A_2$).

The pressure force on area $A_1$ is due to either pressures $P_1$ or $P_2$, whichever is the greater. When pressure $P_1$ is greater, the O ring is forced against the adjacent shoulder of the seat ring, as shown in Figure 8, to mechanically transmit force to the seat ring. If pressure $P_2$ is greater than pressure $P_1$, this pressure urges the O ring against the adjacent shoulder of the body, but it again acts upon the adjacent shoulder of the seat ring, but directly rather than through the O ring. Assuming now that the seat ring is separated from the gate by a thin film of fluid between the lapped surfaces, this film will have a pressure gradient varying from the higher pressure down to the lower, and the average pressure over this area will be about the average of the two pressures. Whether the lapped sealing surfaces cover the full area $A_2$ or is narrower, the average pressure over the area $A_2$ will be about the average of $P_1$ and $P_2$, and will in any case be less than the greater pressure. The force of the fluid pressure on area $A_2$ will not be enough to balance the pressure on $A_1$ which is always acted upon by the higher of the two pressures. Therefore the seat ring will be forced against the gate by the pressure differential, metal to metal contact will balance the extra force, and a positive seal will be assured.

From the foregoing explanation it will be clear that a certain dimensioning is required in order to have the seat ring always urged against the valve member, irrespective of whether or not the line pressure is greater or less than the body pressure. Thus the area of the lapped end face 61 of the seat ring should not be substantially greater than the transverse area of the O ring 69 when within the recess 68. Furthermore the inner diameter of the end face 61 should not be substantially less than the inner diameter of the O ring, and the outer diameter of end face 61 should not be substantially greater than the outer diameter of the O ring. As previously pointed out the inner diameter of the end face 61 may be somewhat greater than the inner diameter of the O ring, and correspondingly the outer diameter of end face 61 can be somewhat less than the outer diameter of the O ring, whereby the actual radial width of the end face 61 is made somewhat less than the radial thickness of the O ring. However care should be taken not to reduce the dimensioning of end face 61 to such an extent as to cause excessive wear when the same is forced into contact with the lapped surface 19, as in actual operation.

A particular advantage gained by maintaining the lapped surfaces 61 and 19 at all times in sealing contact is to avoid entrance of foreign material between these lapped surfaces under all operating conditions. Thus assuming that under a certain operating condition the pressure built up in the body space 16 equals the line pressure, and then the line pressure is reduced to a relatively low value, the excessive body pressure will not cause a temporary separation between the lapped surfaces to vent the same to the line, which would necessarily involve entrance of foreign material between the lapped surfaces. Furthermore when the valve is closed, and considerable line pressure is applied to the inlet side, any possible leakage past the inlet seat ring builds up a pressure in the body and serves to urge the seat ring upon the outlet side against the valve member rather than to urge the seat ring in a direction tending to separate the same from the valve member. In this connection it will be noted that the embodiment of the invention illustrated in Figures 1 to 4 inclusive is not provided with guide means engaging the valve member to receive the thrust of the fluid when the valve member is closed. Thus under such conditions the valve member presses against the seat ring which is on the outflow side. In the embodiment of the invention illustrated in Figures 5 to 7 inclusive, the valve member is guided in such a manner as to take such thrust.

Therefore in this modification pressure maintains force between the seat ring and the valve member for the outflow side of the valve, when the valve member is closed, while in the embodiment of Figures 1 to 4 inclusive the force applied to the valve member may be sufficient to urge the same into sealing contact with the outflow seat ring. In Figures 1 to 4 the differential force applied to the seat rings by fluid pressure aids in maintaining sealing engagement irrespective of small mechanical inaccuracies, because fluid pressure urges the seat rings against the associated valve member irrespective of the accuracy of machining of the body recesses in which the ring is fitted.

It will be evident that the valve described above is suited to a wide variety of services, and is capable of use with relatively high line pressures. A good fluid tight seal can be maintained over relatively long working periods, and irrespective of adverse conditions, such as the presence of gritty solids in the fluid. In case it is desired to disassemble the valve for servicing or repair, it is only necessary to remove the bonnet 27, after which one may remove the valve member, and then the collapsed guard plates 81. The seat rings 60 can then be removed for replacement or repair.

In order to facilitate assembling the valve it is desirable to provide side openings 86, which are normally closed by the plugs 87. With the plugs removed suitable tools can be introduced through openings 86 to temporarily spread the guard plates 81 together with the seat rings 60 to thereby enable introduction of the valve member.

Figures 5, 6, 7:
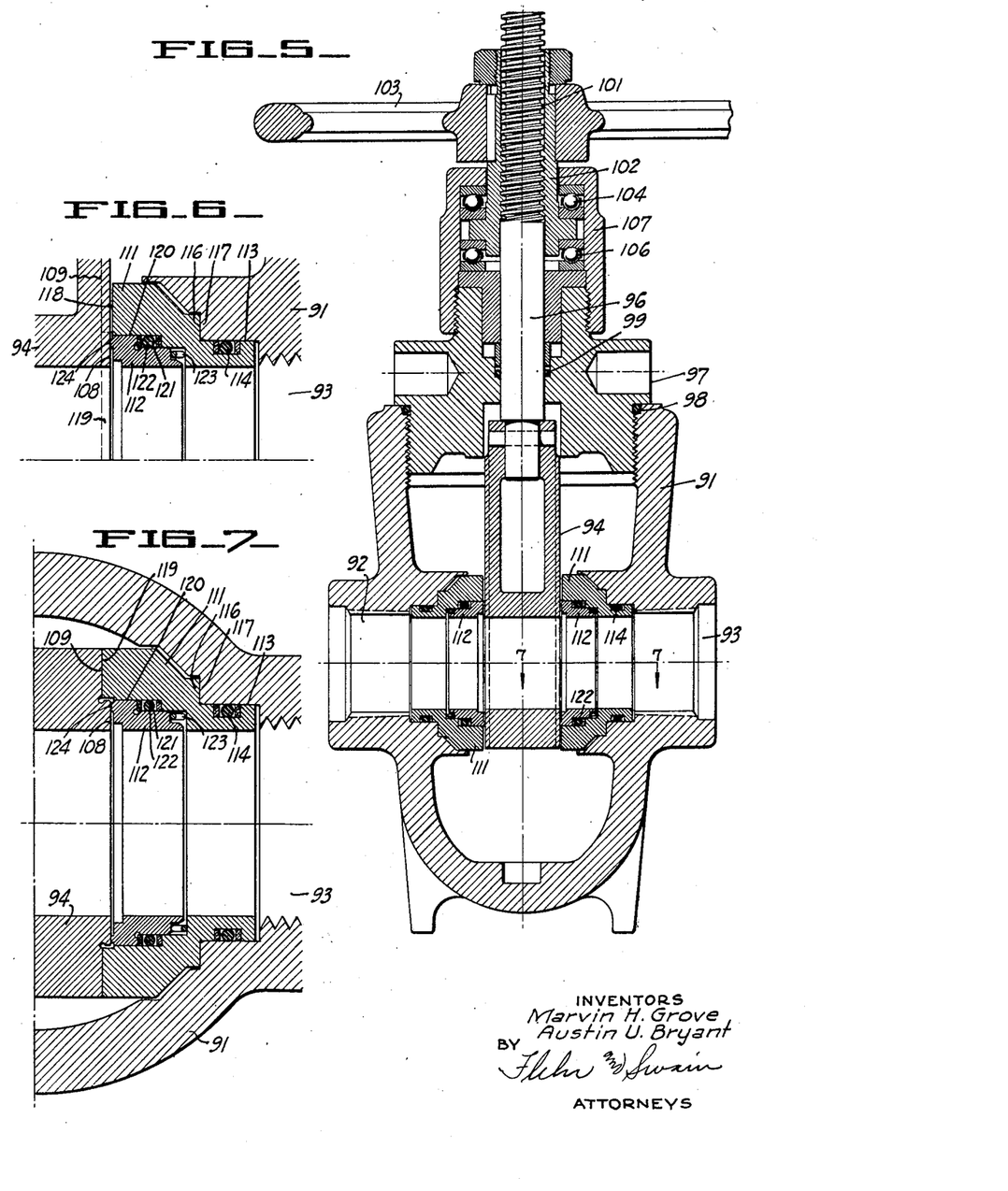
Figure 5 is a side elevational view in section illustrating another embodiment of the invention, which is likewise a gate valve.
Figure 6 is an enlarged cross-sectional detail illustrating one of the sealing rings and its associated parts, incorporated in the valve of Figure 5.
Figure 7 is a cross-sectional detail taken along the line 7—7 of Figure 5, and on an enlarged scale.

The valve illustrated in Figures 5 to 7 inclusive is likewise of the gate type, but in this instance the body 91 is in the form of a suitable casting. The passages 92 and 93 are threaded for connection with associated piping, and the valve member 94 is guided by supplemental means as will be presently described. One end of the valve member 94 is coupled to the valve stem 96, which extends through the bonnet 97. Suitable means such as an O ring 98 serves to seal the bonnet with respect to the body, and another suitable sealing means such as the O ring 99 seals the stem with respect to the bonnet. The exterior end of the stem is provided with a threaded portion 101, which is engaged by a nut 102 attached to the hub of the hand wheel 103. The thrust of the nut is carried by the ball bearing assemblies 104, 106, which are mounted upon the bonnet and carried within the closure cup 107.

The valve working surfaces 108 of the valve member 94 can be machined lapped as with the modification of Figures 1 to 4 inclusive. In addition to these lapped surfaces, the valve member is provided with longitudinally extending surfaces 109, which engage the thrust receiving and guide means.

Upon each side of the valve member there are two concentric rings 111 and 112, the first serving as guide and thrust receiving means, and the second serving as a seal or seat ring. Each ring 111 is fitted within a bore 113 provided in the body, and is sealed with respect to the body by the resilient O ring 114. A shoulder 116 upon each ring 111 is adapted to engage and press against a shoulder 117 formed on the body. The inner face 118 of each ring 111 is set back to accommodate the lapped portion 108 of the valve member, and is also formed to provide side surfaces 119 for engaging the surfaces 109 of the valve member.

Each seat ring 112 is fitted within a bore 120 afforded by the associated ring 111, and is also stepped to provide a space 121 for the resilient O ring 122. An annular spring wire member 123 of zig zag form serves to urge each seat ring against the valve member. The end 124 of each seat ring is suitably finished, as by machine lapping, for sealing engagement with the valve surface 108. It will be noted that the radial dimensioning of the end face 124 is in this instance slightly less than the radial dimensioning of the O ring 122.

Operation of the valve illustrated in Figures 5 to 7 inclusive is similar to the valve of Figures 1 to 4 inclusive. However, as previously mentioned, in this instance when the valve member is in closed position, the force of line pressure against the valve member is taken by the ring 111, which is on the outflow side, rather than by the seat ring. Thus the seat rings on both the inflow and outflow sides of the valve member are at all times free floating and urged by fluid pressure against the valve member, and this is true irrespective of whether or not the body pressure may exceed or be less than the line pressure. With this type of valve, when the valve member is in closed position, there likewise is a double seal against line fluid. The first seal is formed by the seat ring upon the inflow side, and if some leakage should occur past this ring, the body pressure serves to maintain a seal upon the outflow side.

Figure 10:
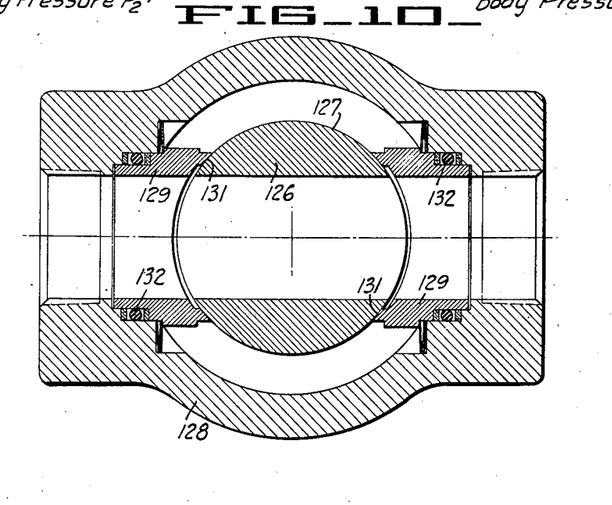
Figure 10 is a cross-sectional view illustrating a modification of the invention in which the valve member has a curved working surface.

The invention described above can be embodied in a wide variety of valves. For example Figure 10 shows application of the invention to a valve of the type in which the valve member is provided with curved valve working surfaces. Thus in this instance the valve member 126 may be in the form of a plug, which may be either cylindrical or conical, or it may be a spherical ball. The outer curved periphery 127 forms the valve working surfaces, and may be machine lapped as previously described. The body 128 is machined to accommodate the seat rings 129, and these rings can be similar in construction to the rings of Figures 1 to 4 inclusive, except that their end faces 131 are machined complementary to the curved valve working surface 127. An O ring 132 likewise seals between the seat ring 129 and the body and the proportioning of the parts is such that the seat ring is at all times urged against the valve working surface 127, irrespective of whether the body pressure may be greater or less than the line pressure. Here again the seat ring upon the outflow side can be relied upon to take the thrust of the valve member for closed position of the same, or if desired additional supplemental means can be provided for receiving such thrust.

The embodiment of the invention illustrated in Figures 11 to 15 inclusive is likewise a valve of the gate type, but in this instance the sealing means provided between each sealing ring and the body is arranged to receive fluid under pressure to urge the sealing ring against the gate. Thus the valve body 136 is provided with the flow passages 137 and 138 and the plate-like gate 139. One end of the gate is removably attached to the stem 114 which extends through the bonnet 142. The bonnet in this instance is held in place by the expansible snap-in ring 143, and is sealed with respect to the body by the O ring 144. The stem is sealed with respect to the bonnet by suitable means such as the plastic packing 145, which can be placed under pressure by the screw means 146. The bonnet carries a cap 147 which serves to house the ball bearing assembly 148. The bearing assembly serves to journal the sleeve 149 which is threaded with respect to the stem 141 and attached to the hand wheel 150.

Figure 11:
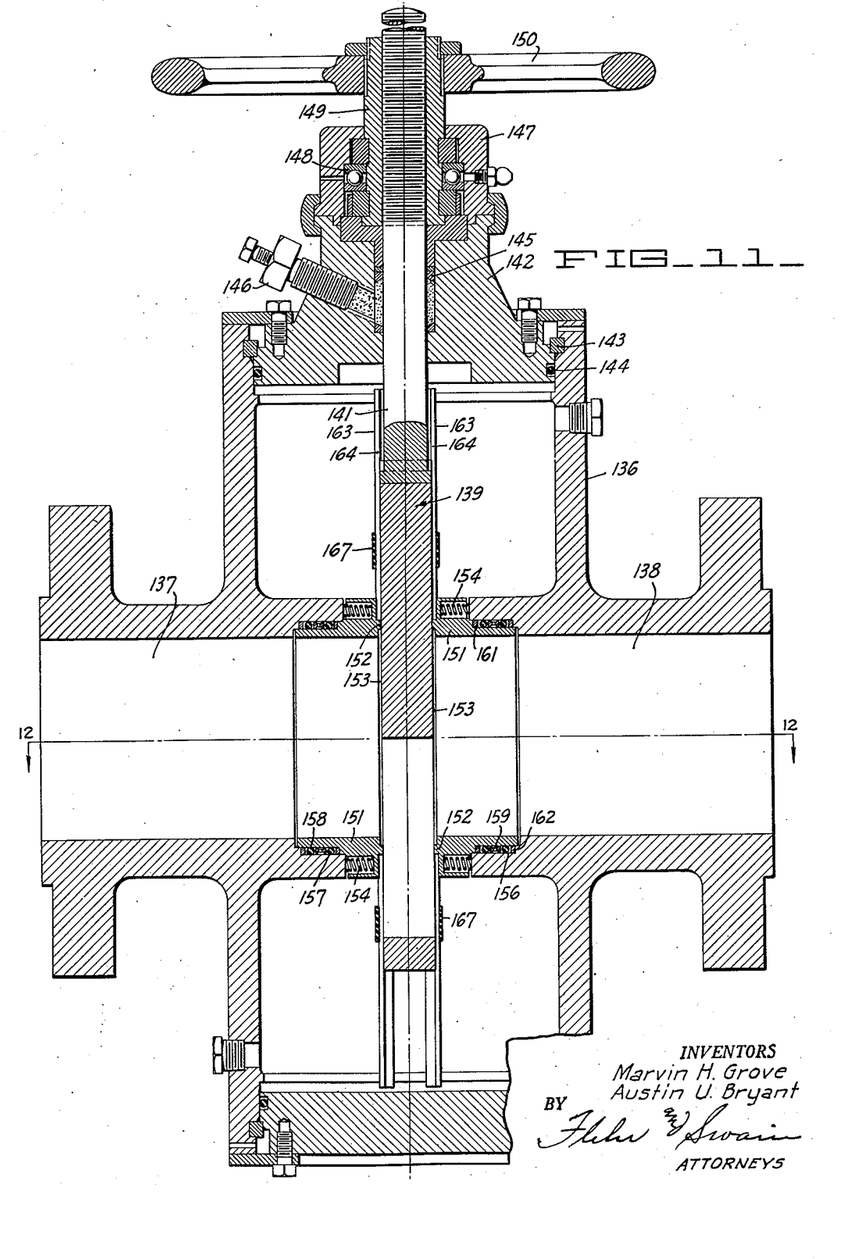
Figure 11 is a side elevational view similar to Figure 1, but illustrating another embodiment of the invention.
Figure 12:
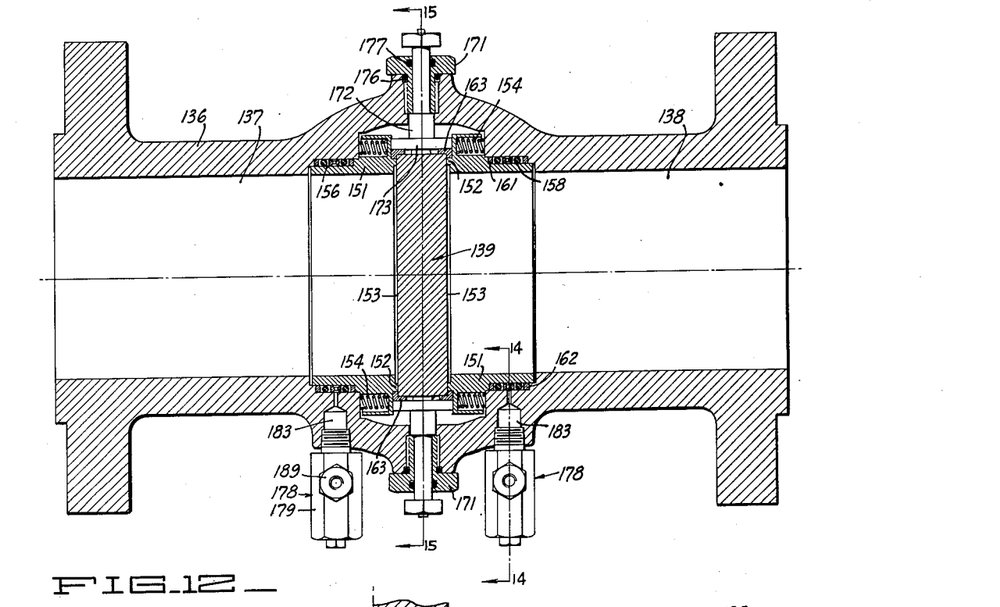
Figure 12 is a cross-sectional detail taken along the line 12—12 of Figure 11.

The body is machined to receive the sealing rings 151, which have annular faces 152 for sealing engagement with the side surfaces 153 of the gate 139. Coil springs 154 serve as mechanical spring means for urging the seat rings against the gate. These coils are disposed at circumferentially spaced intervals about the sealing rings, and are normally compressed.

The annular recess 156 between each sealing ring and the adjacent portion of the body (see Figure 13) is dimensioned in substantially the same manner as described with reference to Figures 8 and 9. However it is extended in a longitudinal direction to accommodate two resilient O rings 157 and 158. Suitable means such as the lantern ring 159 is provided for holding the O rings in spaced relationship. Rings 161 and 162, corresponding to the members 71 and 72 of Figure 4, can be provided at the ends of the recess.

The gate is preferably provided with the guard plates 163 (Figure 11), corresponding to the guard plates 81 of Figure 2. These plates are shown provided with turned edges 164 (Figure 13) to engage about the corners of the gate, and they are formed with openings 166 to receive the adjacent end portions of the seat rings 151. The guard plates are urged together by suitable means such as the elastic or rubber bands 167.

In order to facilitate dismantling and assembly of the parts, means are provided for spreading the guard plates to thereby retract the seat rings 151 from the gate. Thus the sides of the body are bored and threaded to receive the fittings 171, which in turn are bored to receive the rotatable pins 172. Cams 173 are mounted upon the inner ends of the pins, and are disposed to engage the adjacent diametrically opposed portions of the seat rings. Fittings 171 and pins 172 are sealed against leakage by suitable means such as the resilient O rings 176, 177. The faces of the cams are so formed that by rotating the pins 172, after application of a suitable tool to their external ends, the seat rings 151 can be retracted, thus facilitating removal or insertion of the gate and the guard plates.

Figures 13, 14:
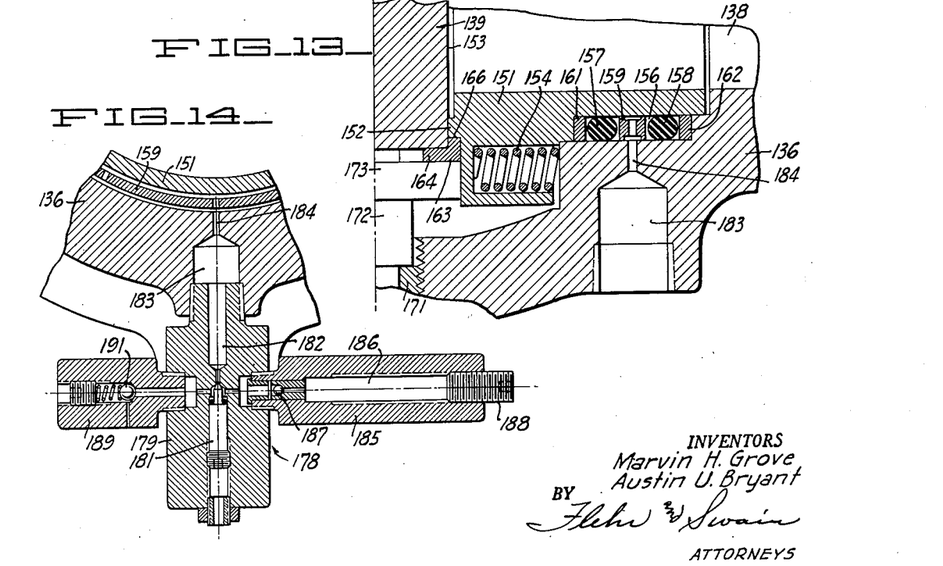
Figure 13 is a cross-sectional detail showing the seal ring and associated parts, and on an enlarged scale.
Figure 14 is a cross-sectional detail illustrating a suitable pressure lubrication fitting for use with the valve of Figures 11 and 12.
Figure 15:
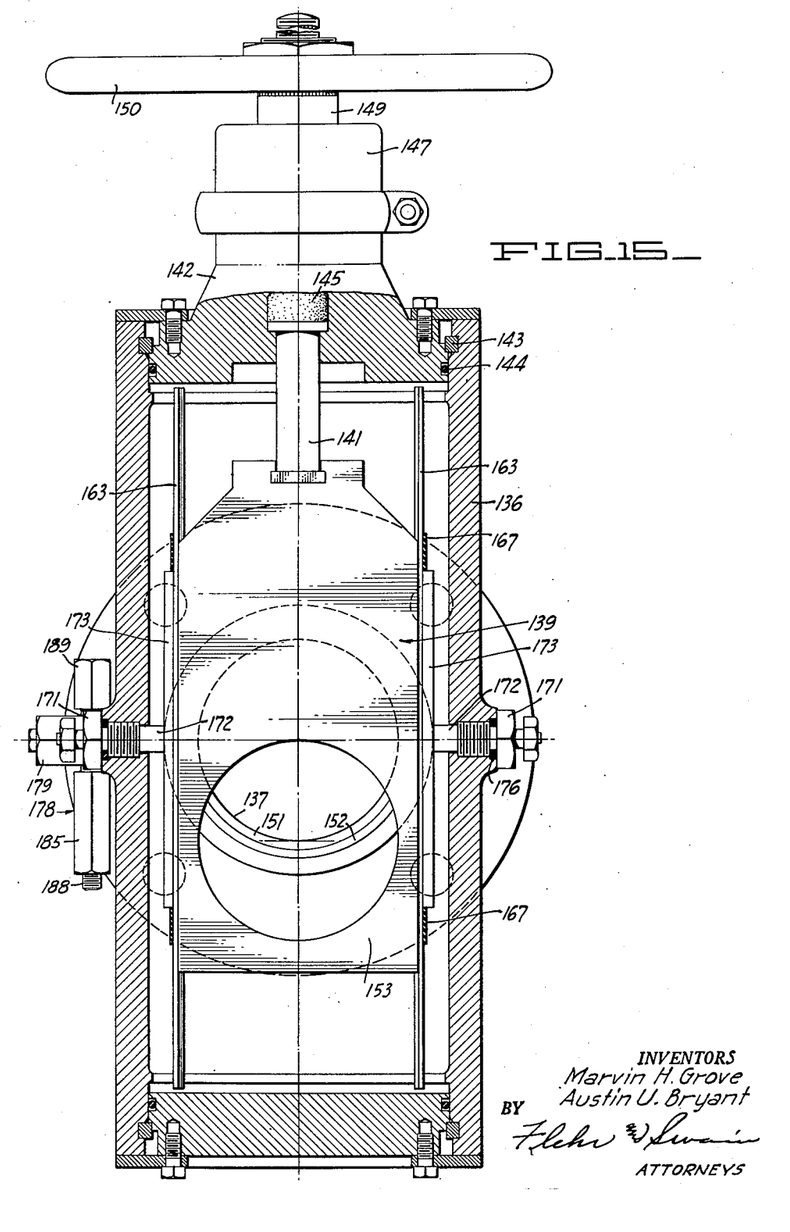
Figure 15 is a side elevational view, in section, illustrating the valve of Figure 11 as viewed parallel to the body passages.

As shown in Figure 14 a suitable fitting 178 is provided whereby a suitable fluid or semifluid material can be introduced into the space between the O rings 157 and 158. Thus a member 179 has threaded attachment with the body, and is bored to receive the needle valve 181. The passage 182, leading from the outlet side of the needle valve, communicates with the body opening 183, which in turn communicates with the recess 156 through duct 184. Member 185 is attached to member 179, and provides a fluid reservoir 186, a check valve 187, and a pressure screw 188. Fluid or semifluid material introduced into bore 186 can be compressed by turning the screw 188, to thereby force such material through the check valve 187, past the needle valve, and into the passage 182.

In order to prevent application of excessive fluid pressures, another member 189 is attached to member 179, and provides a spring loaded relief valve 191. The relief valve, and also the discharge side of the check valve 187, communicate with the inlet side of the needle valve 181.

Operation of the valve described above with reference to Figures 11 to 15 inclusive is as follows: A relatively fluid material can be introduced into the recess 156 by means of fitting 178, such as a hydrocarbon oil or grease. Assuming that the lubricant is not placed under pressure, then its presence in recess 156 serves to lubricate the regions of contact between the resilient O rings and the adjacent surfaces of the recess, to minimize wear and insure sealing. Since the proportioning is the same as described with reference to Figures 8 and 9, the sealing rings are urged against the sides of the gate by either body or line pressure, and irrespective of which pressure predominates. If it appears that the seal is not as tight as desired, due for example to imperfections in the valve working surfaces, or to sticking of the sealing rings in such a manner that they do not properly press against the gate, then the needle valve 181 can be temporarily opened and the lubricant placed under pressure by turning the pressure screw 188. This pressure is transmitted to the recess 156 between the O rings 157 and 158, to force these O rings apart and to hydraulically force the corresponding seat ring against the valve gate. After sufficient force has been applied in this manner the needle valve 181 can be closed, thus maintaining a trapped reservoir of lubricant under pressure which is maintained indefinitely. Pressure maintained in this fashion tends to make it difficult if not impossible to move the gate. Therefore if it is desired to move the gate, needle valve 181 is temporarily opened and the pressure screw 188 retracted to relieve the fluid pressure. Also if it is desired to spread the seat rings to permit removal of the gate, the screw 188 can be retracted a sufficient amount to permit the desired retractive movement.

As described above it is desirable that the fluid or semifluid material be such that one can relieve the pressure for movement of the gate. In addition to use of ordinary fluid oil and greases, the material employed can be a stick form of grease such as is used in the pressure lubrication of plug cocks. Also in place of lubricants having hydrocarbon oils or greases, it is possible to use semifluid plastic materials, or hydrocarbon greases containing added synthetic materials like synthetic rubber.

Figures 16, 17, 18:
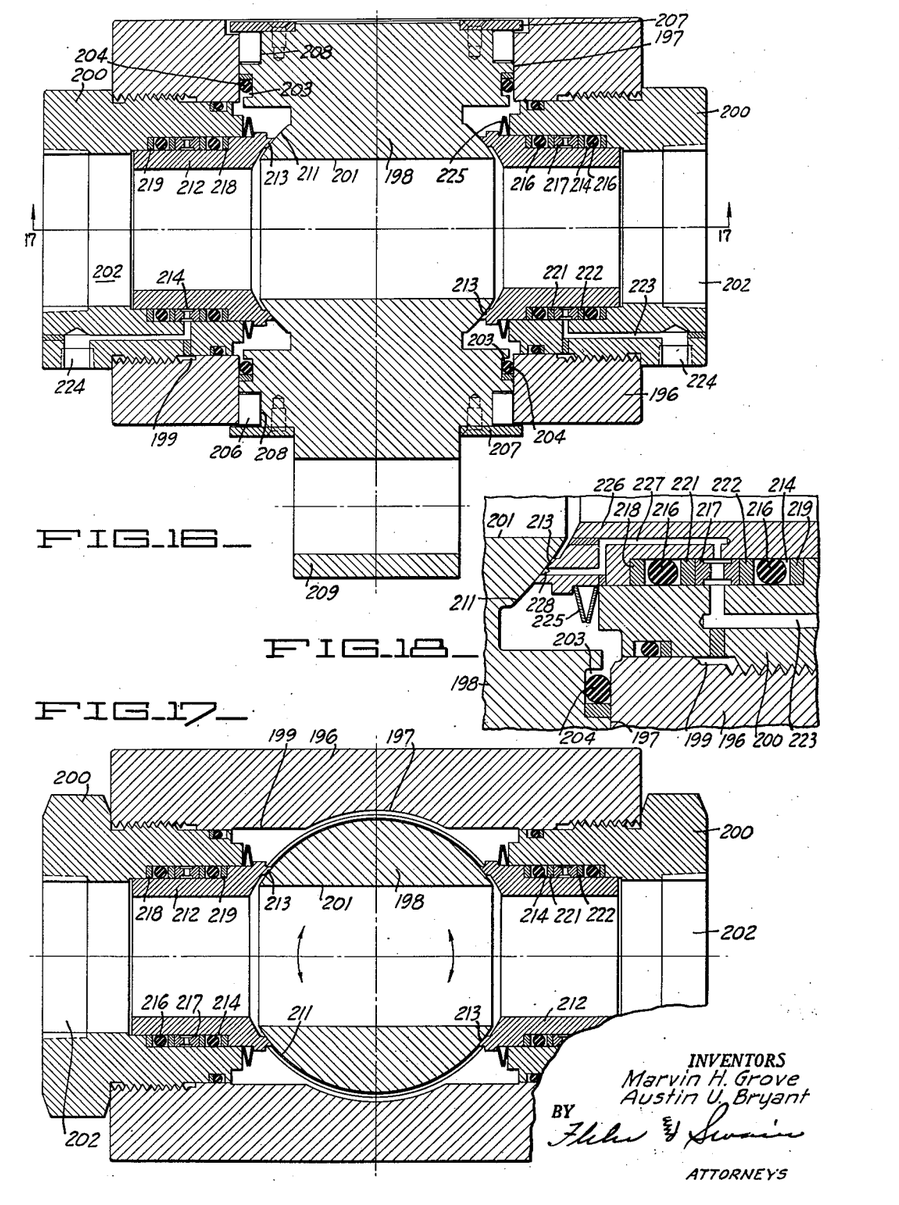
Figure 16 is a cross-sectional view in side elevation illustrating another embodiment of the invention in which the valve member rotates and has a surface corresponding to a sphere.
Figure 17 is a cross-sectional view taken along the line 17—17 of Figure 16.
Figure 18 is an enlarged cross-sectional detail illustrating the seal ring and associated parts incorporated in Figure 16.

Figures 16 to 18 inclusive illustrate a valve having a rotatable member in the form of a ball, and incorporating sealing means similar to that described with reference to Figures 11 to 15 inclusive. In this instance the body 196 is provided with a transverse bore 197 to receive the rotatable valve member 198. The body is also provided with aligned bores 199, which are threaded to receive the coupling sleeves 200. These sleeves can be threaded or otherwise formed for making connection with associated piping. The valve member is provided with a port or passage 201, which is adapted to be turned to either closed or open positions with respect to the flow passages 202.

The end portions of the valve member 198 are machined to fit the bore 197, and to provide the annular grooves or recesses 203 which accommodate the resilient O rings 204. In addition antifriction rollers 206 are distributed about the ends of the valve member and serve to carry side thrust applied to the valve member by virtue of unbalanced pressure. Cover plates 207 serve to retain the rollers within their accommodating recesses 208. One end of the valve member is provided with an extension or stem 209 for application of a turning tool.

The intermediate portion of the valve member is formed to provide the spherical shaped valve working surface 211. Sealing rings 212 are fitted within the sleeves 200, and have annular end faces 213 which are likewise formed spherical shaped, and which seal upon the spherical surface 211 of the valve member. The recess 214 which is provided in conjunction with each seat ring 212, is occupied by the resilient O rings 216 and the lantern ring 217. Likewise leather thrust rings 218 and 219 are disposed at the ends of the recess, and similar rings 221 and 222 are positioned on opposite sides of the lantern ring 217. For introduction of a fluid or semifluid material under pressure between the O rings 216, each sleeve 200 is provided with a duct 223, which leads from the recess 214 to the opening 224. This opening is shown threaded for receiving the fitting 178 of Figure 14.

As suitable spring means for continuously urging the sealing rings toward the valve member, we have shown spring members 225 of the Belville washer type, which correspond to the elements 76 of Figure 4.

With the valve of Figures 16 and 17, it will be evident that a sealing relation will be maintained between the sealing rings and the spherical surface 211 of the valve member, for open or closed position of the latter. Either body or line pressure tends to urge the sealing rings toward the valve member, irrespective of which is the greater. Forces applied laterally of the valve member are carried by the rollers 206, thereby minimizing the torque required to turn the valve member during unbalanced pressure conditions. The ends of the valve member are sealed with respect to the body by the resilient O rings 204, and internal pressure applied to these O rings are balanced, whereby there is no pressure differential tending to move the valve member in the direction of its length. When desired a sealing ring can be forced against the valve surface 211 by applying fluid under pressure through the ducts 223. This pressure can be relieved when it is desired to turn the valve member. It will be noted that the spherical portion of the valve member is smaller in over-all diameter than the diameter of the body bore 197. Therefore upon retraction of the seat rings 212, and after removing one of the cover plates 207, the plug can be retracted lengthwise from the body.

In the embodiment of Figures 11 to 15 inclusive, and also that of Figures 16 and 17, the fluid or semifluid material introduced between the O rings 216 is retained as a trapped body. Assuming the use of fluid or semifluid lubricant, it is possible to supply a portion of the same to the valve working surfaces. Thus as shown in Figure 18, the modified seat ring 226 is provided with a lubricant duct 227 which leads from the recess 214 to a small groove 228, which extends about the sealing face 213. Thus when lubricant is applied under pressure to the recess 214, a part of this lubricant is supplied to the valve working surfaces by way of duct 227.

Figure 19:
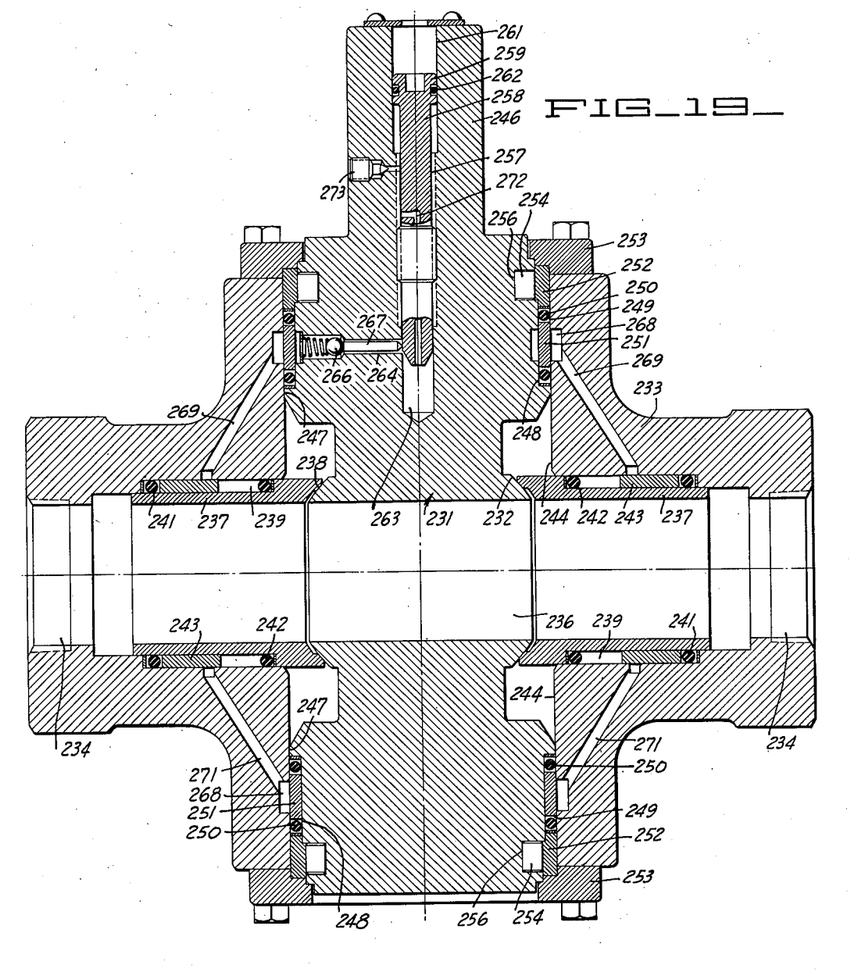
Figure 19 is a side elevational view, in section, showing another embodiment of the invention.

The valve illustrated in Figure 19 likewise makes use of a valve plug 231 which is machined to provide the spherical valve working surface 232. The valve body 233 is formed to provide the flow passages 234, which are adapted to register with the transverse port 236 of the valve plug. The sealing rings 237 are slidably fitted within the body and have spherical formed faces 238 adapted to engage and seal upon the spherical valve surface 232. A recess 239 is provided about each sealing ring 237 and serves to accommodate the spaced O rings 241, 242. The O rings are held apart by the lantern or spacing ring 243.

The aligned bores 244 formed in the valve body serve to accommodate the end portions of the plug, and a stem extension 246 can be provided for turning the plug between open and closed positions. Sealing means provided about each end of the plug is preferably constructed as follows: Each end of the plug is machined to the two diameters 247, 248, to thereby form an annular recess 249 to accommodate the spaced resilient O rings 250. These O rings are separated by the spacer or lantern ring 251. One end of each recess 249 is terminated by the metal filler ring 252, which is fitted within the bore 244, and which is retained by the cover ring 253. Antifriction rollers 254 are fitted within a recess or groove 256 formed in the plug, and engage the inner periphery of the ring 252.

Special lubricating means is provided whereby lubricant under pressure can be applied between the O rings 250 and the O rings 241, 242 for both the sealing rings 237. Thus a central bore 257 is provided in the stem 246 and is threaded to receive the threaded screw 258. The exterior end of this screw is enlarged to form a head 259 which slidably fits the unthreaded bore portion 261 of the stem. Leakage past the head 259 is provided by suitable means such as the resilient O ring 262. The inner end 263 of the bore 257 is adapted to contain lubricating grease or like fluid or semifluid material, and is in communication with a duct 264 which communicates with the adjacent recess 249. A ball check valve 266 prevents backflow of lubricant through the duct 264. A pin 267 extends between the ball check 266 and the inner portion of the screw 258. This pin is of sufficient length whereby when the screw is in the position illustrated in Figure 19, or is further advanced into the plug, the ball check 266 is held in open position. However when the screw is retracted out of contact with pin 267, the ball check 266 is permitted to close. Lubricant in the recess 249 may flow through the communicating recess 268 and duct 269, to the recesses 239 between the O rings 241 and 242. Similar ducts 271 serve to carry lubricant from the recesses 239, to the recess 249 between the O rings at the other end of the plug.

The screw 258 is shown provided with a duct 272 through the same, whereby lubricant from space 263 may flow to the needle valve 273. This needle valve can be manually operated, and is normally closed.

Operation of the valve illustrated in Figure 19 is as follows: A suitable lubricant, such as a semifluid grease, is introduced into the stem bore 257 while the screw 258 is removed. By applying the screw the grease can be caused to flow through the check valve 266 and the ducts 269 and 271, to completely fill the annular recesses 239 surrounding the sealing rings, and also the two recesses 249 at the two ends of the plug. After being filled with grease further turning of the screw 258 places the grease under hydraulic pressure. The hydraulic pressure thus developed tends to urge both of the sealing rings 237 against the spherical valve surface 232 of the valve plug, and in addition pressure is applied to the O rings 250. Because of the fluid tight seals established by the resilient O rings, this pressure can be held indefinitely. The pressure can be so adjusted that the plug may be turned between open and closed positions, without relieving the grease pressure. If desired however, substantially greater pressures can be applied to the grease to more tightly urge the sealing ring against the valve plug. Thereafter it may be necessary to relieve the grease pressure, as by turning the screw 258 to retract the same, before the valve plug can be turned between its operating positions. If it becomes necessary to remove the valve plug for the purpose of making repairs or replacement, then the needle valve 273 is opened to permit grease to vent to the atmosphere, and thereafter the sealing rings can be retracted from the plug, with displacement of grease, to permit the plug to pass between the sealing rings and to be completely retracted from the body. After reassembly of the plug within the body, the valve can be returned to operative position by reintroducing sufficient grease to return the sealing rings to a position in sealing contact with the plug.

Applying grease under pressure between the O rings at the ends of the plugs greatly facilitates maintenance of these O rings in proper sealing and lubricated condition. In this connection it is well known that the presence of a lubricating grease greatly facilitates maintenance of a proper seal by a resilient O ring. In addition it is recognized that the presence of a lubricating film of grease facilitates use of a resilient O ring between relatively rotatable parts, without causing excessive wear when subjected to relatively high fluid pressures. Thus in our valve construction we promote maintenance of a good seal between the ends of the valve plug and the valve body, while at the same time avoiding excessive wear of the O rings, and facilitating turning movement without excessive friction.

It will be evident that our invention has many advantages over conventional types of valves. Because the sealing rings are at all times in sealing engagement with the valve working surfaces, there is little if any opportunity for dirt or grit to find its way between the surfaces in sealing contact. During opening and closing the sealing surfaces slide across each other with a shearing action, thus dislodging and shearing away any accumulation of foreign material, without causing the same to be forced between the working surfaces. Considering the pressures to which the invention is applicable, the valve member can be moved with a minimum amount of applied force. When desired fluid pressure can be applied to tightly force the seat rings against the adjacent valve member, thus insuring a fluid tight seal under various operating conditions. When such means is employed manufacture of the valve can be materially simplified, as by applying less expensive surface finishing methods which will suffice for a tight seal when the parts are tightly pressed together.

We claim:

1. In a valve construction, a body having a flow passage, a valve member having a valve working surface and movable between open and closed positions with respect to said passage, a rigid seat ring means surrounding said passage and having one end face of the same disposed in sealing contact with said valve working surface, said rigid seat ring means being carried by the body and being capable of being urged independently of the body against said valve working surface, adjacent portions of said seat ring means and said body affording a closed annular space defined by radially spaced concentric surfaces together with one shoulder face formed on the seat ring means and another opposed shoulder face more remote from the valve working surface and formed on the body, sealing means interposed between said last named concentric surfaces and serving to seal against leakage between the seat ring means and said body, said end face of said seat ring means which contacts the valve working surface providing an annular contact area having a mean effective diameter corresponding substantially to the mean diameter of said sealing means, said sealing means being adapted to be urged to apply force against either the one or the other shoulder face by pressure applied from the passage or from the body space about the seat ring means respectively.

2. A valve as in claim 1 in which the effective fluid end face area of said rigid seat ring means is not substantially greater than the transverse area of the sealing means extending between said concentric surfaces.

3. A valve construction as in claim 1 in which said sealing means is of the O ring type.

4. In a valve construction, a body having a flow passage, a valve member having a valve working surface and movable between open and closed position with respect to said passage, an annular rigid seat ring means surrounding said passage and having one end face of the same disposed in sealing contact with said valve working surface, said seat ring means being slidably fitted within the body and being capable of being urged against said valve working surface, adjacent portions of said seat ring means and said body affording a closed annular space defined by radially spaced concentric surfaces together with one shoulder face formed on the seat ring means and another opposed shoulder face remote from the valve working surface and formed on the body, annular resilient sealing means interposed between said last named concentric surfaces and compressed radially to establish sealing engagement with said concentric surfaces, said end face of said seat ring means which contacts the valve working surface providing an annular contact area having a mean effective diameter corresponding substantially to the mean diameter of said sealing means, the spacing between said shoulder faces being greater than the thickness of the annular space occupied by the resilient sealing means as measured longitudinally of the axis of the seat ring means, said sealing means being urged to apply force against the one or the other of said shoulder faces by pressure applied from the passage or from the body space about the seat ring means, respectively.

5. In a valve construction, a body having a flow passage, a valve member having a valve working surface and movable between open and closed position with respect to said passage, an annular rigid seat ring means surrounding said passage and having one end face of the same disposed in sealing contact with said valve working surface, said seat ring means being slidably fitted within the body and being capable of being urged against said valve working surface, adjacent portions of said seat ring means and said body affording a closed annular space defined by radially spaced concentric surfaces together with one shoulder face formed on the seat ring and another opposed shoulder face remote from the valve working surface and formed on the body, resilient sealing means interposed between said last named concentric surfaces and serving to seal against leakage between the seat ring means and said body, said sealing means comprising two spaced annular resilient sealing elements, the end face of the seat ring which contacts the valve working surface providing an annular contact area having a mean effective diameter corresponding substantially to the mean diameter of said resilient sealing means, one or the other of said sealing elements being adapted to be urged against either the one or the other of said shoulder faces by pressure applied from the passage or from the body space about the seat ring means, respectively, and means for introducing a fluid material into the space between said resilient sealing elements.

6. In a valve construction, a body having a flow passage, a valve member having a valve working surface and movable between open and closed positions with respect to said passage, an annular rigid seat ring means surrounding said passage and having one end face of the same disposed in sealing contact with said valve working surface, said seat ring means being slidably fitted within the body and being capable of being urged against said valve working surfaces, adjacent portions of said seat ring means and said body affording a closed annular space defined by radially spaced concentric surfaces together with one shoulder face formed on the seat ring means and another opposed shoulder face remote from the valve working surface and formed on the body, at least two spaced resilient O rings interposed between said last named concentric surfaces and serving to seal against leakage between the seat ring means and said body, a lantern ring disposed between said resilient O rings, means for introducing fluid material under pressure into the space between said resilient O rings and for maintaining such material under pressure, said end face of the rigid seat ring means which contacts the valve working surface providing an annular contact area having a mean effective diameter corresponding substantially to the mean diameter of said sealing means, one or the other of said O rings being adapted to be urged against either the one or the other of said shoulder faces by pressure applied from the passage or from the body space about the seat ring means respectively.

7. A valve construction as in claim 5 together with means for retracting the seat ring means from the valve member.

8. In a valve construction, a body having a flow passage, a valve member having a valve working surface and movable between open and closed positions with respect to said passage, and rigid annular seat ring means surrounding said passage having one end face of the same disposed in sealing contact with the valve working surface of the valve member, said rigid seat ring means being carried by the body but being capable of being urged against the valve member, a surface on the seat ring means being disposed to abut a surface on the body whereby the seat ring means forms an abutment to take the thrust of the valve member toward the same, and means including a resilient O-ring forming a fluid tight seal between the seat ring means and the body, the proportioning of said seat ring means in conjunction with the proportioning of said sealing means presenting a fluid pressure area to pressure in said passage to cause the seat ring means to be urged against the valve member when the pressure in the passage exceeds the pressure surrounding said end face of the seat ring means, and also affording a fluid pressure area to pressure surrounding said end face of the seat ring means whereby when said latter pressure exceeds pressure in the passage said seat ring means is likewise urged by fluid pressure in a direction against said valve member, said O-ring being located intermediate the ends of the seat ring and completely enclosed between the seat ring means and the surrounding portion of the body.

9. A valve as in claim 8 in which two of said seat ring means are provided, said two seat ring means being disposed on opposite sides of said valve member.

10. A valve as in claim 9 together with means carried by the body for retracting said seat ring means from the valve member, said means having an operating member exterior of the body.

11. A valve as in claim 9 in which the valve member is in the form of a gate having parallel sides forming valve working surfaces.

12. A valve as in claim 9 in which the valve member is in the form of a rotatable plug.

13. A valve as in claim 1 in which said sealing means consists of a pair of resilient sealing rings of the O-ring type, together with means positioned between said O-rings for maintaining the same spaced apart, and means for introducing fluid under pressure into the space between said sealing rings.

References Cited in the file of this patent

UNITED STATES PATENTS

| | | |
|---|---|---|
| 1,871,965 | Du Bois | Aug. 16, 1932 |
| 2,030,458 | McKeller | Feb. 11, 1936 |
| 2,109,042 | Bennet | Feb. 22, 1938 |
| 2,235,307 | Atkinson | Mar. 18, 1941 |
| 2,504,924 | Fennema | Apr. 18, 1950 |
| 2,570,413 | Volpin | Oct. 9, 1951 |
| 2,600,898 | Maxwell | June 17, 1952 |
| 2,603,449 | Overholser | July 15, 1952 |

FOREIGN PATENTS

| | | |
|---|---|---|
| 2,292 | Great Britain | of 1889 |
| 353,900 | Germany | of 1922 |